(12) United States Patent
Yurovsky et al.

(10) Patent No.: US 11,494,713 B2
(45) Date of Patent: Nov. 8, 2022

(54) ROBOTIC PROCESS AUTOMATION ANALYTICS PLATFORM

(71) Applicant: UiPath, Inc., New York, NY (US)

(72) Inventors: Michelle Yurovsky, Princeton, NJ (US); Nic Surpatanu, Woodinville, WA (US)

(73) Assignee: UiPath, Inc., New York, NY (US)

( * ) Notice: Subject to any disclaimer, the term of this patent is extended or adjusted under 35 U.S.C. 154(b) by 0 days.

(21) Appl. No.: 17/005,347

(22) Filed: Aug. 28, 2020

(65) Prior Publication Data
US 2022/0067599 A1 Mar. 3, 2022

(51) Int. Cl.
*G06Q 10/06* (2012.01)

(52) U.S. Cl.
CPC ..... *G06Q 10/0631* (2013.01); *G06Q 10/0633* (2013.01)

(58) Field of Classification Search
CPC .......................................... G06Q 10/00–50/00
USPC ................................................ 705/7.11–7.42
See application file for complete search history.

(56) References Cited

U.S. PATENT DOCUMENTS

| | | | |
|---|---|---|---|
| 8,090,611 B2 * | 1/2012 | Hodges | G06Q 10/06311 705/7.14 |
| 10,307,906 B2 | 6/2019 | Shah et al. | |
| 10,682,761 B2 | 6/2020 | Geffen et al. | |
| 10,735,522 B1 * | 8/2020 | Sathianarayanan | G06Q 10/103 |
| 10,885,423 B1 * | 1/2021 | Voicu | G06F 9/451 |
| 10,891,569 B1 * | 1/2021 | Werner | G06Q 10/06316 |
| 2005/0093881 A1 * | 5/2005 | Okita | G06Q 10/06 345/589 |
| 2006/0167704 A1 * | 7/2006 | Nicholls | G06Q 10/06393 705/7.39 |
| 2006/0190286 A1 * | 8/2006 | Segal | G06Q 40/00 705/1.1 |
| 2008/0313634 A1 * | 12/2008 | Matsueda | G06Q 10/06 718/100 |
| 2009/0138318 A1 * | 5/2009 | Hawkins | G06Q 10/06 705/7.27 |
| 2009/0144120 A1 * | 6/2009 | Ramachandran | G06Q 10/0633 714/2 |
| 2009/0157590 A1 * | 6/2009 | Mijares | E21B 43/00 703/2 |
| 2011/0238458 A1 * | 9/2011 | Purcell | G06F 9/5072 709/204 |
| 2012/0173276 A1 * | 7/2012 | Compton | G06Q 30/018 705/2 |
| 2012/0253892 A1 * | 10/2012 | Davidson | G06Q 10/0631 705/7.42 |
| 2013/0066665 A1 * | 3/2013 | Tamhane | G06Q 30/02 705/7.12 |
| 2014/0047028 A1 * | 2/2014 | Buth | G06F 9/546 709/204 |
| 2015/0286969 A1 * | 10/2015 | Warner | G06Q 10/0633 705/7.27 |

(Continued)

*Primary Examiner* — Alan S Miller
(74) *Attorney, Agent, or Firm* — Chiesa Shahinian & Giantomasi PC

(57) ABSTRACT

Systems and methods for evaluating robotic process automation (RPA) are provided. RPA data from a plurality of RPA related data sources is received. Each of the RPA related data sources is associated with a different RPA product. One or more measures of interest are calculated based on the RPA data. The one or more calculated measures of interest are output.

30 Claims, 7 Drawing Sheets

(56) References Cited

U.S. PATENT DOCUMENTS

| | | | |
|---|---|---|---|
| 2015/0310361 A1* | 10/2015 | Steele | G06F 8/20 |
| | | | 717/101 |
| 2016/0162478 A1* | 6/2016 | Blassin | G06Q 10/063112 |
| | | | 706/12 |
| 2017/0286199 A1* | 10/2017 | Soini | G06F 9/44 |
| 2017/0372442 A1* | 12/2017 | Mejias | G16H 40/20 |
| 2018/0197123 A1* | 7/2018 | Parimelazhagan | |
| | | | G06Q 10/0633 |
| 2018/0349482 A1* | 12/2018 | Oliner | H04L 41/0604 |
| 2019/0155225 A1* | 5/2019 | Kothandaraman | G06N 3/006 |
| 2019/0303779 A1 | 10/2019 | Van Briggle et al. | |
| 2019/0332508 A1 | 10/2019 | Goyal et al. | |
| 2020/0050983 A1* | 2/2020 | Balasu | G06F 40/30 |
| 2020/0108500 A1 | 4/2020 | Murthy et al. | |
| 2020/0147791 A1 | 5/2020 | Safary et al. | |
| 2020/0206920 A1* | 7/2020 | Ma | G06K 9/6223 |
| 2020/0219033 A1* | 7/2020 | Smutko | G06N 5/048 |
| 2020/0262063 A1* | 8/2020 | Perera | B25J 9/1661 |
| 2021/0011698 A1* | 1/2021 | Bond | G06F 8/60 |
| 2021/0051203 A1* | 2/2021 | Sathianarayanan | G06Q 10/103 |

* cited by examiner

ROBOTIC PROCESS AUTOMATION ANALYTICS PLATFORM

TECHNICAL FIELD

The present invention relates generally to robotic process automation (RPA), and more particularly to an RPA analytics platform for end-to-end evaluation of RPA.

BACKGROUND

Robotic process automation (RPA) is a form of process automation that uses software robots to automate workflows. RPA may be implemented to automate repetitive and/or labor-intensive tasks to reduce costs and increase efficiency. Typically, RPA is implemented with a suite of RPA products or platforms each performing different RPA functions, such as, e.g., process mining, task capture, or automation. However, such suite of RPA platforms are often disconnected and do not share RPA data with each other. Accordingly, current techniques for evaluating RPA are limited to measures of interest calculated separately for each RPA platform, and are not able to provide end-to-end evaluation of RPA for the suite of RPA platforms as a whole.

BRIEF SUMMARY OF THE INVENTION

In accordance with one or more embodiments, systems and methods for evaluating robotic process automation (RPA) are provided. RPA data from a plurality of RPA related data sources is received. Each of the RPA related data sources is associated with a different RPA product. One or more measures of interest are calculated based on the RPA data. The one or more calculated measures of interest are output.

In one embodiment, the RPA data from each of the plurality of RPA related data sources is in a different format.

In one embodiment, calculating one or more measures of interest includes calculating an execution time of a long running workflow as a time from a start of execution of the long running workflow to a completion of the execution of the long running workflow excluding time that the execution of the long running workflow was suspended.

In one embodiment, calculating one or more measures of interest includes calculating a run time of a workflow as a time from a start of execution of the workflow to a completion of the execution of the workflow.

In one embodiment, calculating one or more measures of interest includes calculating a money saved metric, a time saved metric, or a number of robot hours metric representing a number of hours RPA robots spent executing a workflow. In one embodiment, an actual measure of interest and an expected measure of interest may be calculated and the actual measure of interest and the expected measure of interest may be compared.

In one embodiment, the one or more calculated measures of interest are output by displaying a dashboard depicting the one or more calculated measures of interest.

These and other advantages of the invention will be apparent to those of ordinary skill in the art by reference to the following detailed description and the accompanying drawings.

DETAILED DESCRIPTION

Figure 1:
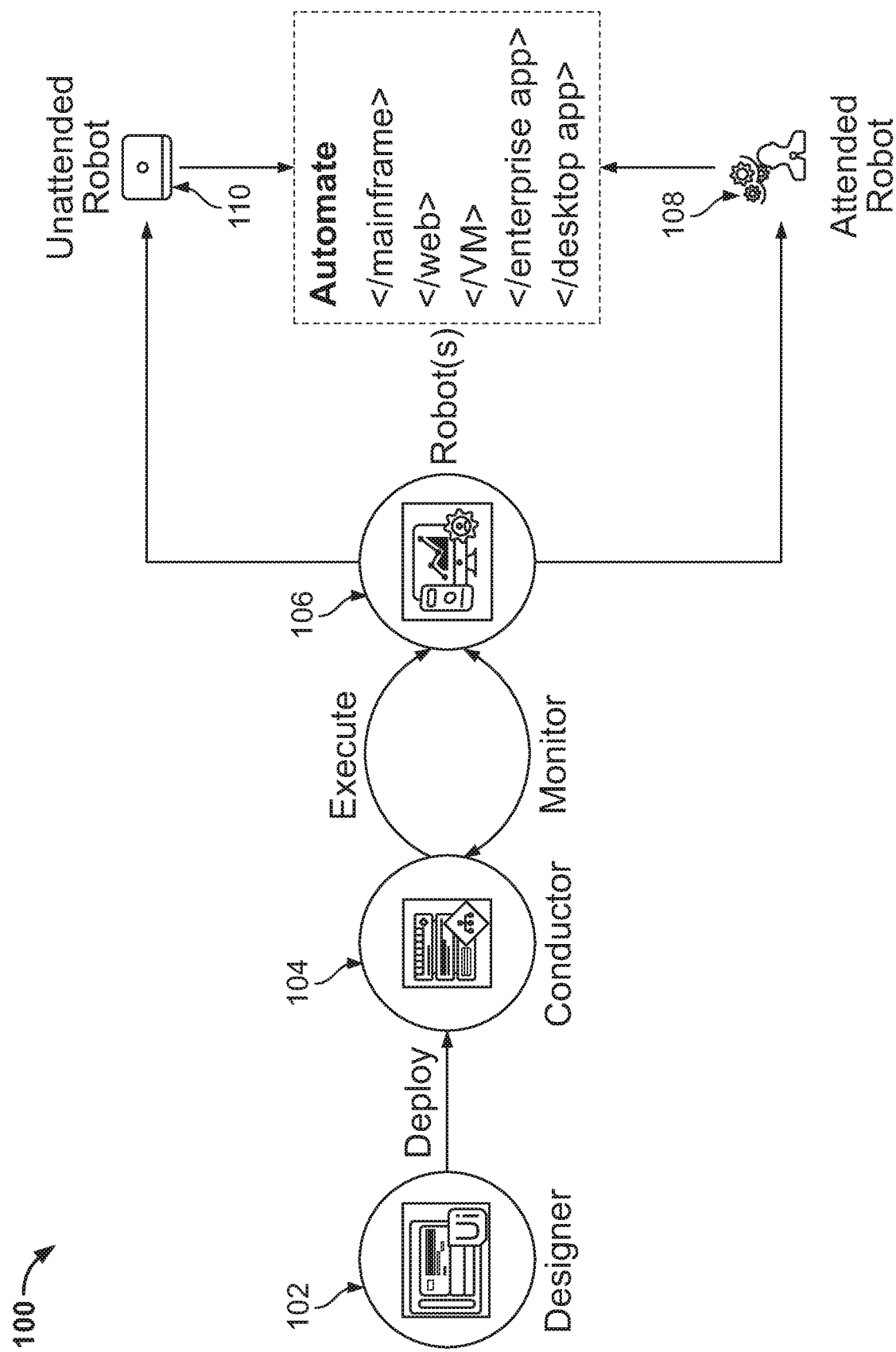
FIG. 1 is an architectural diagram illustrating a robotic process automation (RPA) system, according to an embodiment of the invention.

Robotic process automation (RPA) is used for automating workflows and processes. FIG. 1 is an architectural diagram of an RPA system 100, in accordance with one or more embodiments. As shown in FIG. 1, RPA system 100 includes a designer 102 to allow a developer to design automation processes. More specifically, designer 102 facilitates the development and deployment of RPA processes and robots for performing activities in the processes. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a process, defined herein as "activities." Each activity may include an action, such as clicking a button, reading a file, writing to a log panel, etc. In some embodiments, processes may be nested or embedded.

Some types of processes may include, but are not limited to, sequences, flowcharts, Finite State Machines (FSMs), and/or global exception handlers. Sequences may be particularly suitable for linear processes, enabling flow from one activity to another without cluttering a process. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a process is developed in designer 102, execution of business processes is orchestrated by a conductor 104, which orchestrates one or more robots 106 that execute the processes developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of RPA robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run processes built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
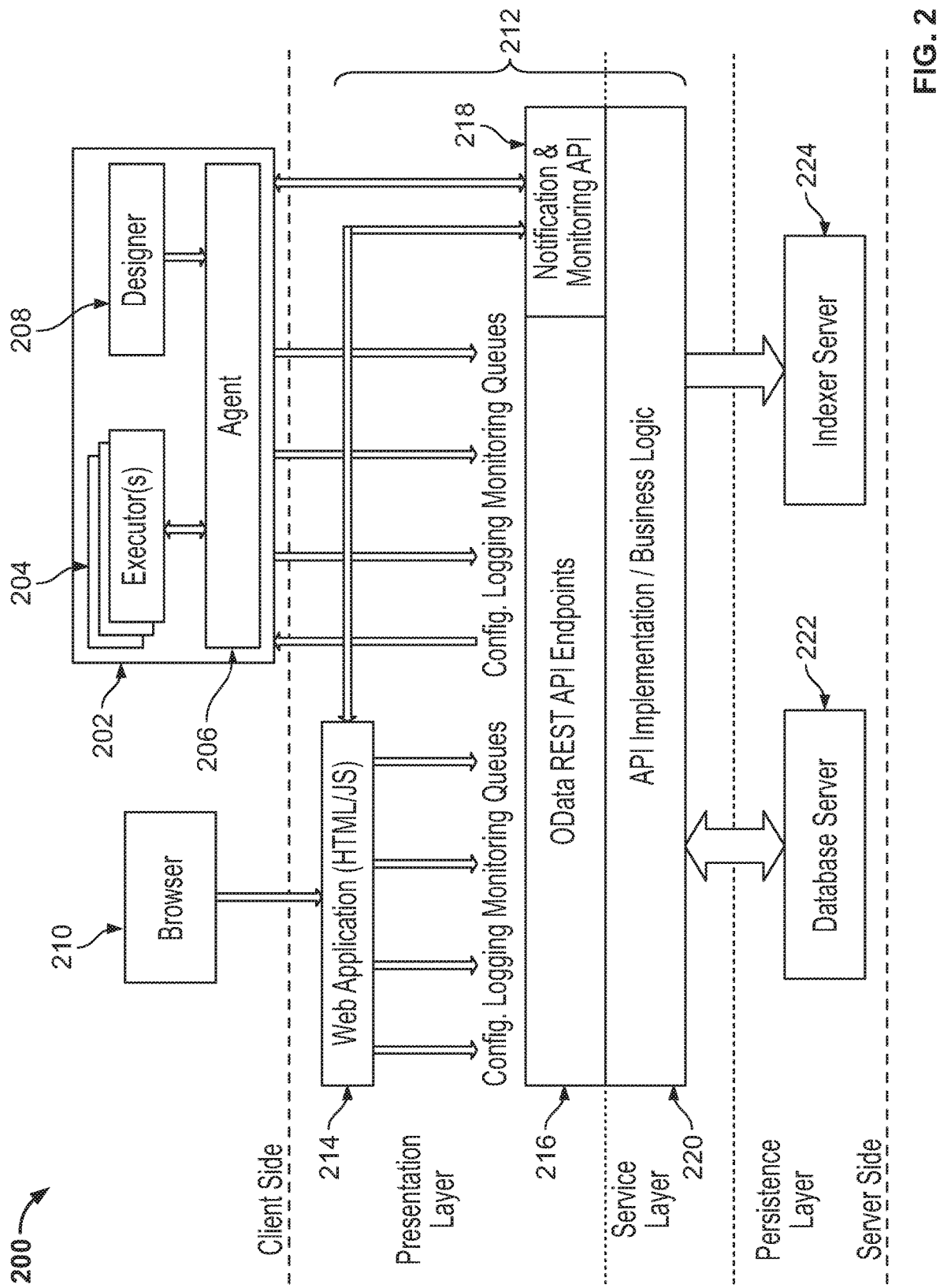
FIG. 2 is an architectural diagram illustrating an example of a deployed RPA system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
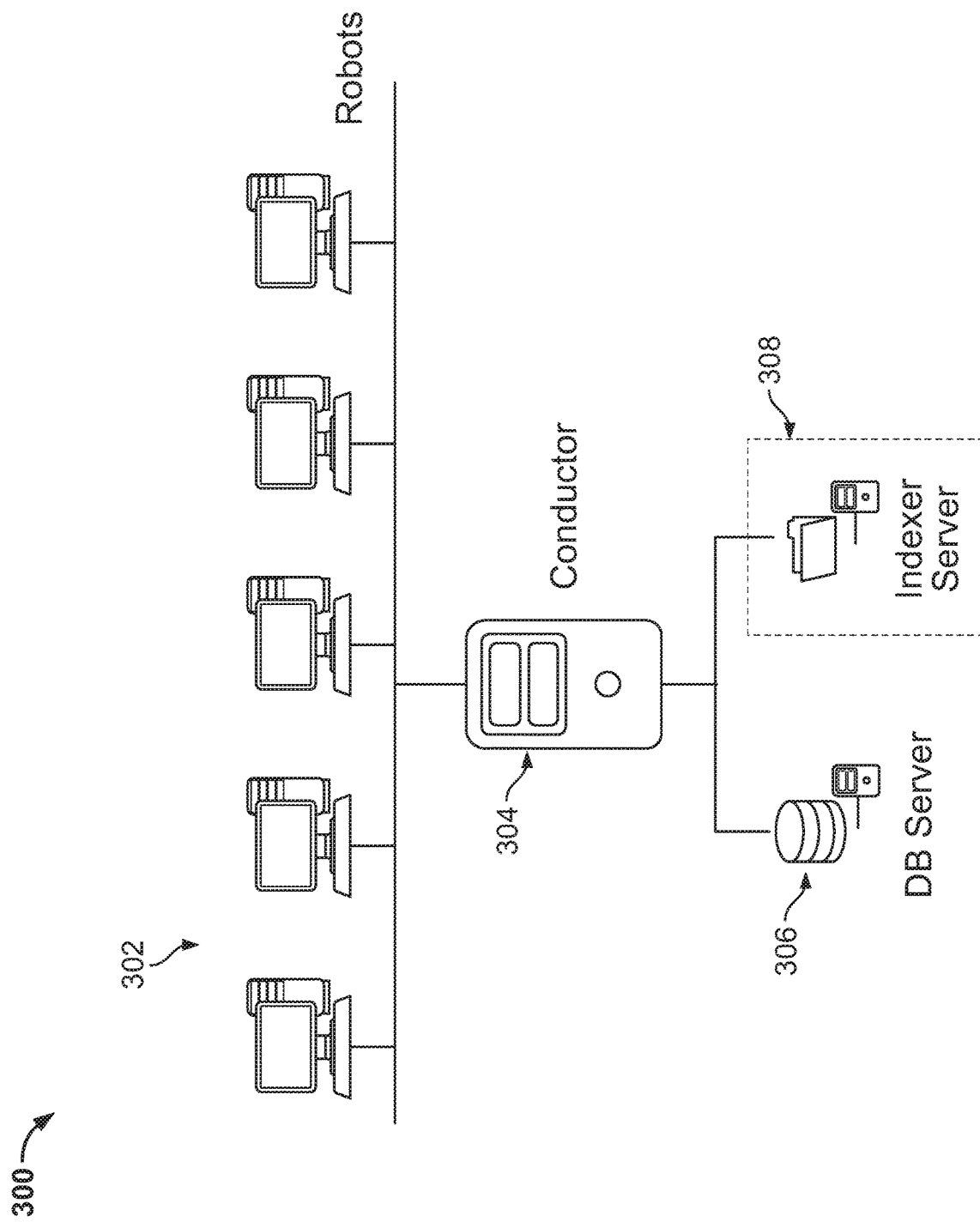
FIG. 3 is an architectural diagram illustrating a simplified deployment example of a RPA system, according to an embodiment of the invention.

FIG. 3 is an architectural diagram illustrating a simplified deployment example of RPA system 300, in accordance with one or more embodiments. In some embodiments, RPA system 300 may be, or may include, RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

Embodiments described herein provide for a unified platform for end-to-end evaluation of RPA for a suite of RPA products of an RPA platform. The RPA products each perform different RPA functions, such as, e.g., process mining, task capture, or automation, for the RPA platform. Embodiments described herein enable end-to-end evaluation of RPA by calculating one or more measures of interest based on RPA data associated with a plurality of RPA related data sources. Advantageously, embodiments described herein provide for a unified evaluation of the suite of RPA products as a whole, enabling users to determine the costs saved, the time saved, and other metrics relating to the return on investment of RPA.

Figure 4:
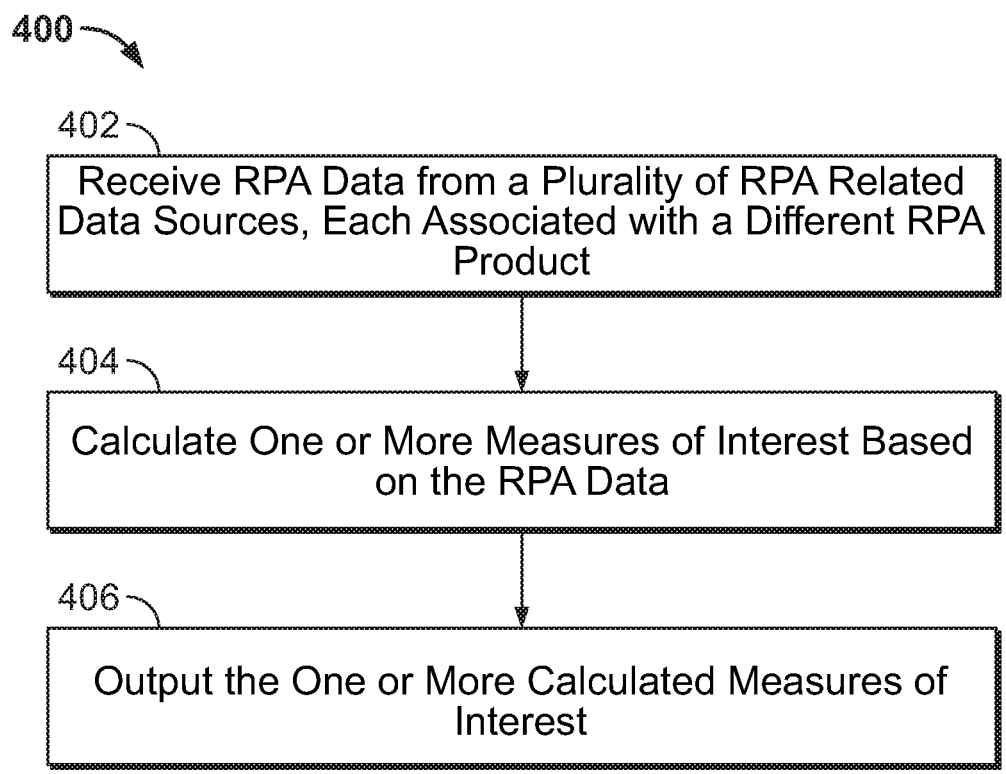
FIG. 4 shows a method for evaluating RPA, according to an embodiment of the invention.

FIG. 4 shows a method 400 for calculating one or more measures of interest, in accordance with one or more embodiments. Method 400 may be performed by one or more suitable computing devices, such as, e.g., computing system 700 of FIG. 7.

At step 402, RPA data is received from a plurality of RPA related data sources, each associated with a different RPA product. Each RPA product performs a different RPA function, such as, e.g., process mining, task capture, or automation, for an RPA platform. In one embodiment, the RPA data comprises data relating to the execution of workflows by one or more RPA robots for an RPA product.

In one embodiment, the RPA data is in a tabular data format, such as, e.g., a CSV (comma-separated values) format, TSV (tab-separated values) format, or Excel format. However, the format of the RPA data may be of any other suitable format (e.g., JSON (JavaScript Object Notation)). In one embodiment, the RPA data received from each RPA related data source is in a different format and the RPA data is converted to a standard format (e.g., tabular data format). The RPA data may be converted using known techniques.

The RPA data may be received in response to a user (e.g., an RPA developer or an RPA customer) manually transmitting the RPA data or may be automatically received at a scheduled time or at predefined time intervals. The RPA data may be received from the user or directly from the RPA products. The RPA data may be received by loading previously stored RPA data from a storage or memory of a computer system or by receiving RPA data transmitted from a remote computer system.

At step 404, one or more measures of interest are calculated based on the RPA data. The measures of interest may be any metric for evaluating RPA.

In one embodiment, the measures of interest may include, or may be calculated based on, an execution time of a long running workflow executed by one or more RPA robots. As used herein, a long running workflow is a workflow that includes one or more activities that depend on an occurrence of an external event in order to complete the activity. An external event of a particular long running workflow is any event that does not result from execution of the particular long running workflow. An example of an external event is a user event requiring input from a user. A long running workflow is executed over a relatively long period of time (e.g., hours or days) and may be suspended and resumed at any point in time to wait for the occurrence of the external event, thereby providing long running behavior to the workflow. While the long running workflow is suspended, execution of the long running workflow has not completed but no RPA robots are executing the long running workflow. The execution time of the long running workflow is calculated based on RPA data such as, e.g., times at which execution of the long running workflow has started, suspended, resumed, and completed, which may be extracted from event logs of execution of workflows. The execution time of the long running workflow is calculated as the time from the start of the execution of the long running workflow to the completion of the execution of the long running workflow by one or more RPA robots, excluding time that the execution of the long running workflow was suspended (i.e., the time that the long running workflow was suspended and resumed).

In one embodiment, the measures of interest may include, or may be calculated based on, a run time of a workflow (including long running workflows). The run time of the workflow is calculated based on RPA data such as, e.g., times at which execution of the long running workflow has started and completed, which may be extracted from event logs of execution of workflows. The run time of the workflow is calculated as the time from the start of the execution of the workflow to the completion of the execution of the workflow (including the time that the workflow was suspended).

In one embodiment, the measures of interest include metrics representing a return on investment of the RPA. For example, the measures of interest may include a costs or money saved metric, a time saved metric, and a number of robot hours metric representing the number of hours RPA robots spent executing a workflow. In one embodiment, the time saved metric may be determined as the sum of a baseline time to manually complete the process, the time to rework the process due to errors, and the time to audit/review the process. The costs saved metric may be determined as the product of the time saved (e.g., in hours) by automating the workflow and the cost (e.g., per hour) of a user to manually perform the process. The number of robot hours metric may be determined as the total execution time of RPA robots.

In one embodiment, the measures of interest includes actual measures of interest for an actual execution of one or more workflows or expected measures of interest for a predicted execution of one or more workflows. Values of the actual measures of interest may be compared with values of the expected measures of interest. For example, an actual number of executed workflows may be compared with an expected number of executed workflows or an actual return on investment may be compared with an expected return on investment. Such comparisons allow an entity (e.g., a user or organization) to understand the time utilized by RPA robots to complete execution of a workflow, as well as the costs.

Any other suitable measures of interest may also be calculated based on the RPA data. Other exemplary measures of interest include a workflow error rate or a number of executed workflows for a given period of time may be calculated.

At step 406, the one or more calculated measures of interest are output. The calculated measures of interest may be output by, for example, displaying the calculated measures of interest on a display device of a computer system or by storing the calculated measures of interest on a memory or storage of a computer system. In one embodiment, the calculated measures of interest are displayed on one or more dashboards to visualize and compare the calculated measures of interest. The dashboards may integrate measures of interest for a plurality of RPA platforms, enabling comparison of the RPA platforms. Exemplary dashboards are shown in FIGS. 5 and 6.

Figure 5:
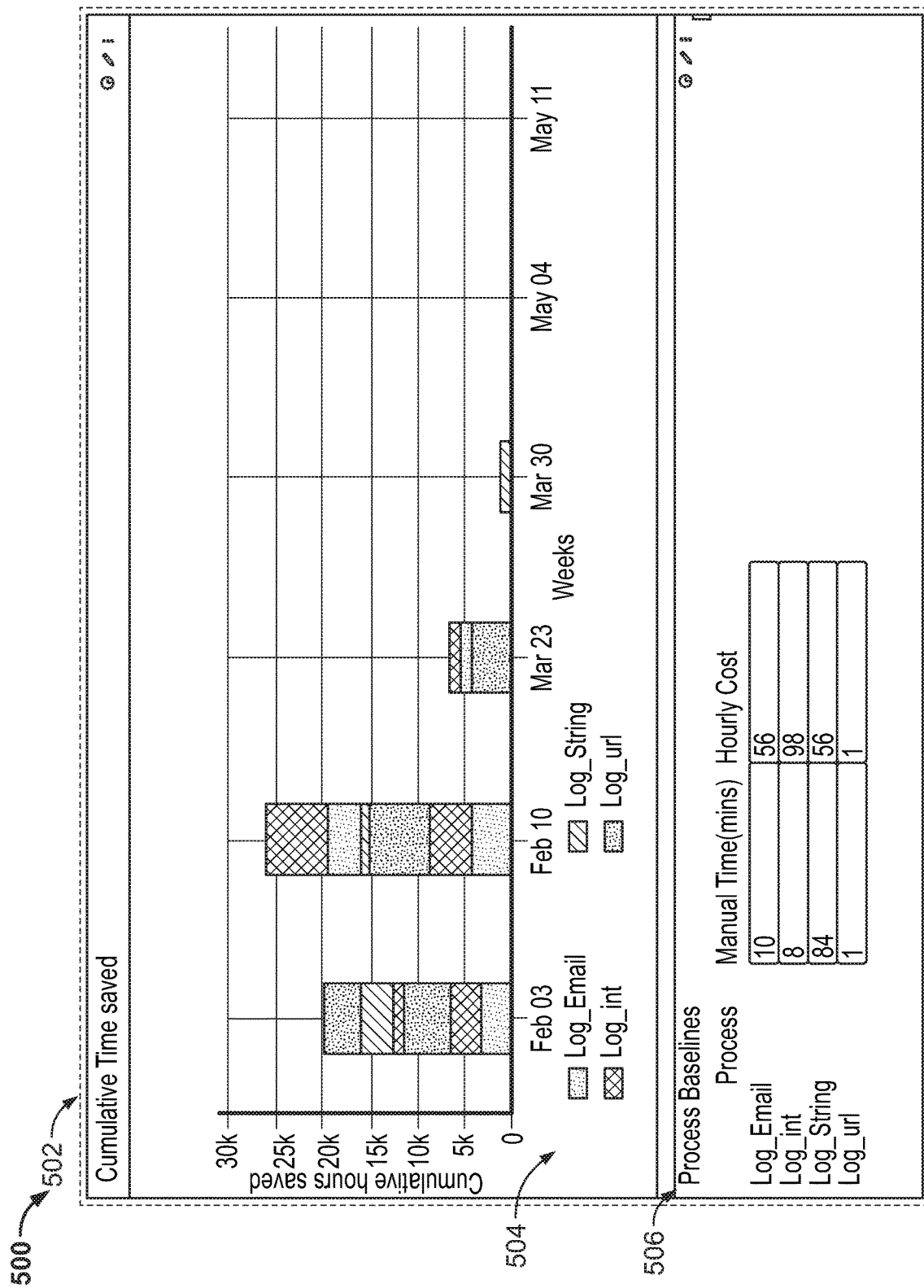
FIG. 5 shows a dashboard visualizing a cumulative time saved metric, according to an embodiment of the invention.

FIG. 5 shows a dashboard 500 visualizing a cumulative time saved metric, in accordance with one or more embodiments. Dashboard 500 depicts bar graph 502 visualizing a relationship between cumulative hours saved and time (in weeks) for workflows 504. Process baselines 506 defines the manual time (in minutes) required for a user to complete workflows 504 and hourly costs for a user to complete workflows 504. Process baselines 506 may be received as user input and are used to calculate the time saved metric.

Figure 6:
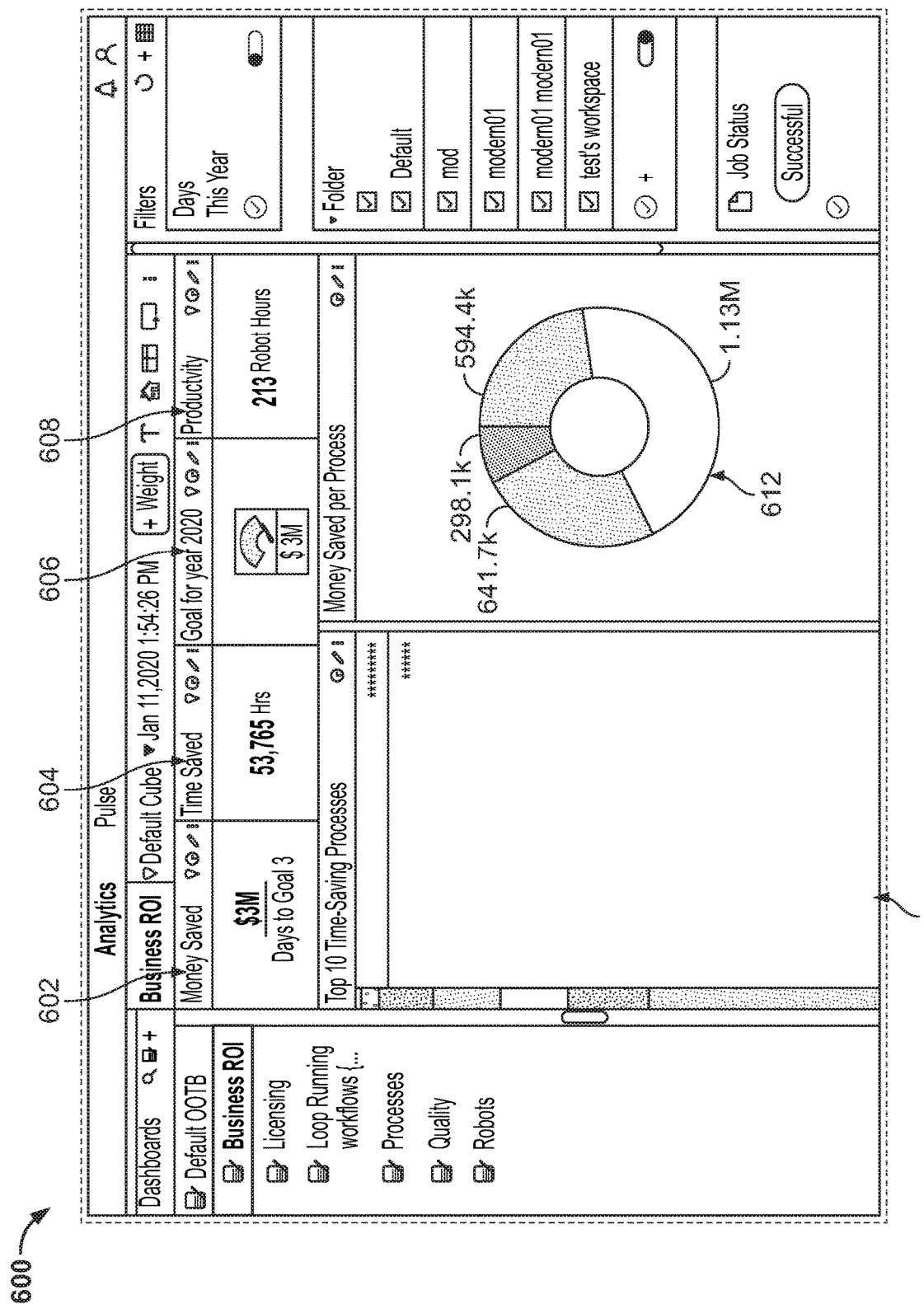
FIG. 6 shows a dashboard visualizing various measures of interest, according to an embodiment of the invention.

FIG. 6 shows a dashboard 600 visualizing various measures of interest, in accordance with one or more embodiments. Dashboard 600 depicts a money saved metric 602, a time saved metric 604, a goal indicator 606 representing a current value of a particular measure of interest with respect to a goal for the particular measure of interest, and a productivity metric 608 representing the number of robot hours spent by RPA robots executing workflows. Dashboard 600 also depicts a graph 610 showing the top (e.g., 10) time saving workflows and a pie graph 612 showing money saved per workflow.

Figure 7:
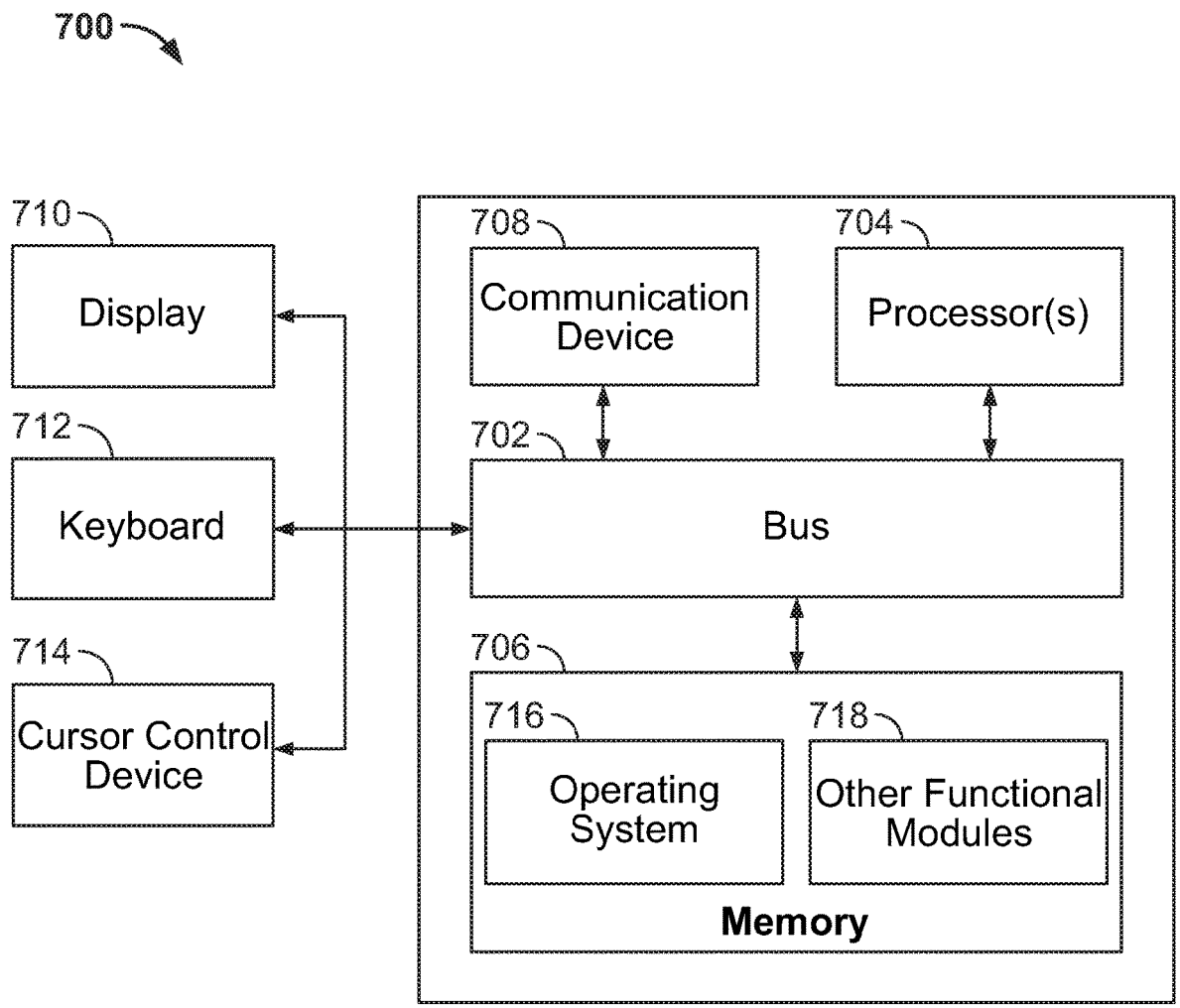
FIG. 7 is a block diagram of a computing system according to an embodiment of the invention.

FIG. 7 is a block diagram illustrating a computing system 700 configured to execute the methods, workflows, and processes described herein, including method 400 of FIG. 4, according to an embodiment of the present invention. In some embodiments, computing system 700 may be one or more of the computing systems depicted and/or described herein. Computing system 700 includes a bus 702 or other communication mechanism for communicating information, and processor(s) 704 coupled to bus 702 for processing information. Processor(s) 704 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 704 may also have multiple processing cores, and at least some of the cores may be configured to perform specific functions. Multi-parallel processing may be used in some embodiments.

Computing system 700 further includes a memory 706 for storing information and instructions to be executed by processor(s) 704. Memory 706 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 704 and may include volatile media, non-volatile media, or both. The media may also be removable, non-removable, or both.

Additionally, computing system 700 includes a communication device 708, such as a transceiver, to provide access to a communications network via a wireless and/or wired connection according to any currently existing or future-implemented communications standard and/or protocol.

Processor(s) 704 are further coupled via bus 702 to a display 710 that is suitable for displaying information to a user. Display 710 may also be configured as a touch display and/or any suitable haptic I/O device.

A keyboard 712 and a cursor control device 714, such as a computer mouse, a touchpad, etc., are further coupled to bus 702 to enable a user to interface with computing system. However, in certain embodiments, a physical keyboard and mouse may not be present, and the user may interact with the device solely through display 710 and/or a touchpad (not shown). Any type and combination of input devices may be used as a matter of design choice. In certain embodiments, no physical input device and/or display is present. For instance, the user may interact with computing system 700 remotely via another computing system in communication therewith, or computing system 700 may operate autonomously.

Memory 706 stores software modules that provide functionality when executed by processor(s) 704. The modules include an operating system 716 for computing system 700 and one or more additional functional modules 718 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method comprising:
    receiving robotic process automation (RPA) data from a plurality of RPA related data sources, each associated with a different RPA product, wherein the RPA data is in a plurality of different formats;
    converting the RPA data from the plurality of different formats to a standardized format;
    calculating one or more measures of interest based on the converted RPA data, wherein calculating one or more measures of interest based on the converted RPA data comprises:
        calculating an execution time of a long running workflow as a time from a start of execution of the long running workflow to a completion of the execution of the long running workflow excluding time that the execution of the long running workflow was suspended; and
    displaying a dashboard visualizing the one or more calculated measures of interest on a display device.

2. The computer-implemented method of claim 1, wherein calculating one or more measures of interest based on the converted RPA data further comprises:
    calculating a run time of a workflow as a time from a start of execution of the workflow to a completion of the execution of the workflow.

3. The computer-implemented method of claim 1, wherein calculating one or more measures of interest based on the converted RPA data further comprises:
    calculating a money saved metric.

4. The computer-implemented method of claim 1, wherein calculating one or more measures of interest based on the converted RPA data further comprises:
    calculating a time saved metric.

5. The computer-implemented method of claim 1, wherein calculating one or more measures of interest based on the converted RPA data further comprises:
    calculating an actual measure of interest and an expected measure of interest; and
    comparing the actual measure of interest with the expected measure of interest.

6. A computer-implemented method comprising:
    receiving robotic process automation (RPA) data from a plurality of RPA related data sources, each associated with a different RPA product, wherein the RPA data is in a plurality of different formats;
    converting the RPA data from the plurality of different formats to a standardized format;

calculating one or more measures of interest based on the converted RPA data, wherein calculating one or more measures of interest based on the converted RPA data comprises:
  calculating a number of robot hours metric representing a number of hours RPA robots spent executing a workflow; and
displaying a dashboard visualizing the one or more calculated measures of interest on a display device.

7. The computer-implemented method of claim 6, wherein calculating one or more measures of interest based on the converted RPA data further comprises:
  calculating a run time of a workflow as a time from a start of execution of the workflow to a completion of the execution of the workflow.

8. The computer-implemented method of claim 6, wherein calculating one or more measures of interest based on the converted RPA data further comprises:
  calculating a money saved metric.

9. The computer-implemented method of claim 6, wherein calculating one or more measures of interest based on the converted RPA data further comprises:
  calculating a time saved metric.

10. The computer-implemented method of claim 6, wherein calculating one or more measures of interest based on the converted RPA data further comprises:
  calculating an actual measure of interest and an expected measure of interest; and
  comparing the actual measure of interest with the expected measure of interest.

11. An apparatus comprising:
  a memory storing computer instructions; and
  at least one processor configured to execute the computer instructions, the computer instructions configured to cause the at least one processor to perform operations of:
  receiving robotic process automation (RPA) data from a plurality of RPA related data sources, each associated with a different RPA product, wherein the RPA data is in a plurality of different formats;
  converting the RPA data from the plurality of different formats to a standardized format;
  calculating one or more measures of interest based on the converted RPA data, wherein calculating one or more measures of interest based on the converted RPA data comprises:
    calculating an execution time of a long running workflow as a time from a start of execution of the long running workflow to a completion of the execution of the long running workflow excluding time that the execution of the long running workflow was suspended; and
  displaying a dashboard visualizing the one or more calculated measures of interest on a display device.

12. The apparatus of claim 11, wherein calculating one or more measures of interest based on the converted RPA data further comprises:
  calculating a run time of a workflow as a time from a start of execution of the workflow to a completion of the execution of the workflow.

13. The apparatus of claim 11, wherein calculating one or more measures of interest based on the converted RPA data further comprises:
  calculating a money saved metric.

14. The apparatus of claim 11, wherein calculating one or more measures of interest based on the converted RPA data further comprises:
  calculating a time saved metric.

15. The apparatus of claim 11, wherein calculating one or more measures of interest based on the converted RPA data further comprises:
  calculating an actual measure of interest and an expected measure of interest; and
  comparing the actual measure of interest with the expected measure of interest.

16. A non-transitory computer readable medium storing computer program instructions, the computer program instructions when executed by at least one processor cause the at least one processor to perform operations comprising:
  receiving robotic process automation (RPA) data from a plurality of RPA related data sources, each associated with a different RPA product, wherein the RPA data is in a plurality of different formats;
  converting the RPA data from the plurality of different formats to a standardized format;
  calculating one or more measures of interest based on the converted RPA data, wherein calculating one or more measures of interest based on the converted RPA data comprises:
    calculating a number of robot hours metric representing a number of hours RPA robots spent executing a workflow; and
  displaying a dashboard visualizing the one or more calculated measures of interest on a display device.

17. The non-transitory computer readable medium of claim 16, wherein calculating one or more measures of interest based on the converted RPA data further comprises:
  calculating a time saved metric.

18. The non-transitory computer readable medium of claim 16, wherein calculating one or more measures of interest based on the converted RPA data further comprises:
  calculating an actual measure of interest and an expected measure of interest; and
  comparing the actual measure of interest with the expected measure of interest.

19. The non-transitory computer readable medium of claim 16, wherein calculating one or more measures of interest based on the converted RPA data further comprises:
  calculating a run time of a workflow as a time from a start of execution of the workflow to a completion of the execution of the workflow.

20. The non-transitory computer readable medium of claim 16, wherein calculating one or more measures of interest based on the converted RPA data further comprises:
  calculating a money saved metric.

21. An apparatus comprising:
  a memory storing computer instructions; and
  at least one processor configured to execute the computer instructions, the computer instructions configured to cause the at least one processor to perform operations of:
  receiving robotic process automation (RPA) data from a plurality of RPA related data sources, each associated with a different RPA product, wherein the RPA data is in a plurality of different formats;
  converting the RPA data from the plurality of different formats to a standardized format;
  calculating one or more measures of interest based on the converted RPA data, wherein calculating one or more measures of interest based on the converted RPA data comprises:
    calculating a number of robot hours metric representing a number of hours RPA robots spent executing a workflow; and displaying a dashboard visualizing the one or more calculated measures of interest on a display device.

22. The apparatus of claim 21, wherein calculating one or more measures of interest based on the converted RPA data further comprises: calculating a run time of a workflow as a time from a start of execution of the workflow to a completion of the execution of the workflow.

23. The apparatus of claim 21, wherein calculating one or more measures of interest based on the converted RPA data further comprises: calculating a money saved metric.

24. The apparatus of claim 21, wherein calculating one or more measures of interest based on the converted RPA data further comprises: calculating a time saved metric.

25. The apparatus of claim 21, wherein calculating one or more measures of interest based on the converted RPA data further comprises: calculating an actual measure of interest and an expected measure of interest; and comparing the actual measure of interest with the expected measure of interest.

26. A non-transitory computer readable medium storing computer program instructions, the computer program instructions when executed by at least one processor cause the at least one processor to perform operations comprising:
   receiving robotic process automation (RPA) data from a plurality of RPA related data sources, each associated with a different RPA product, wherein the RPA data is in a plurality of different formats;
   converting the RPA data from the plurality of different formats to a standardized format;
   calculating one or more measures of interest based on the converted RPA data, wherein calculating one or more measures of interest based on the converted RPA data comprises:
   calculating an execution time of a long running workflow as a time from a start of execution of the long running workflow to a completion of the execution of the long running workflow excluding time that the execution of the long running workflow was suspended; and
   displaying a dashboard visualizing the one or more calculated measures of interest on a display device.

27. The non-transitory computer readable medium of claim 26, wherein calculating one or more measures of interest based on the converted RPA data further comprises: calculating a run time of a workflow as a time from a start of execution of the workflow to a completion of the execution of the workflow.

28. The non-transitory computer readable medium of claim 26, wherein calculating one or more measures of interest based on the converted RPA data further comprises: calculating a money saved metric.

29. The non-transitory computer readable medium of claim 26, wherein calculating one or more measures of interest based on the converted RPA data further comprises: calculating a time saved metric.

30. The non-transitory computer readable medium of claim 26, wherein calculating one or more measures of interest based on the converted RPA data further comprises: calculating an actual measure of interest and an expected measure of interest; and comparing the actual measure of interest with the expected measure of interest.

\* \* \* \* \*